Figure 1:
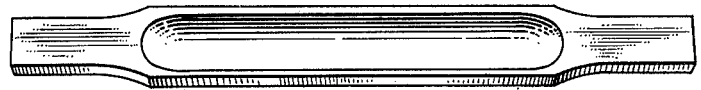

May 4, 1965  V. MANDORF, JR  3,181,968
METHODS FOR METAL VAPORIZATION
Filed July 25, 1960

INVENTOR.
VICTOR MANDORF, JR.
BY
ATTORNEY

United States Patent Office 3,181,968
Patented May 4, 1965

3,181,968
METHODS FOR METAL VAPORIZATION
Victor Mandorf, Jr., Fostoria, Ohio, assignor to Union Carbide Corporation, a corporation of New York
Filed July 25, 1960, Ser. No. 45,069
7 Claims. (Cl. 117—107)

The subject invention relates to methods and apparatus wherein metals are vaporized on a continuous or semi-continuous basis in order to deposit thin films thereof on various objects. While applicable to other metals, the invention will be described mainly by reference to aluminum.

The vaporization of aluminum usually is effected in a vacuum chamber containing objects to which aluminum films or aluminum coating are to be applied. In this vacuum chamber is placed a crucible or evaporator containing aluminum to be vaporized. This crucible is usually heated by electrical resistance heating or by electromagnetic induction heating.

The most common practice in this art is to use crucibles composed of carbon or graphite. Owing to the very short operating life of these materials, easily corroded by molten aluminum at its vaporizing temperature, such crucibles are frequently protected by an outer coating of such materials as titanium carbide, hafnium carbide, tantalum carbide, and others, which are corrosion resistant and which will increase the wettability of the crucible by the molten aluminum. This approach restricts performance to the inherent physical properties of the coatings used. For this reason, crucibles having the said coatings have a useful life of only a few hours, even at relatively low vaporization rates. These limitations have made it impractical to consider commercial operations of continuous, high speed, aluminium vapor coating processes in industry. Accordingly, vapor coating has usually been restricted to a batch, or semi-batch type of operation.

More recent research has led to the conclusion that the inertness of boron nitride (BN) to liquid aluminum would make it an ideal material for the subject purpose.

The major difficulty with using plain boron nitride crucibles for the above related purpose is that such crucibles, owing to the high electrical resistivity of boron nitride, have to be heated by an outside source. One method is the employment of a resistance-heated carbon container. Together the boron nitride crucible and the carbon container form a double crucible system. Although use of a double crucible has some merit, it has a major drawback. When the system is heated to the desired temperatures of about 1100° C. to 1400° C., and aluminum is fed into the crucible, the metal may creep up and over the sides of the inner crucible onto the carbon crucible, and react to form aluminum carbide. When this happens, the carbon crucible tends to crack rapidly, thus breaking the electrical heating circuit. The equipment then must be shut down, and new crucibles installed.

Another method of heating aluminum in a boron nitride vessel is by induction heating. This method, however, is costly from the standpoint of equipment design.

The main object of this invention is to provide a self-heated evaporating crucible or evaporator for aluminuim which will have such an increased service life over prior art crucibles or evaporators used for this purpose, that it becomes practical to operate a commercial high speed metal vaporization process on a continuous basis.

Another object of the invention is to provide a method of vaporizing aluminum which will provide a greater amount of vaporization for a given amount of power used for heating, owing to the use of the crucible of the invention.

Figure 2:
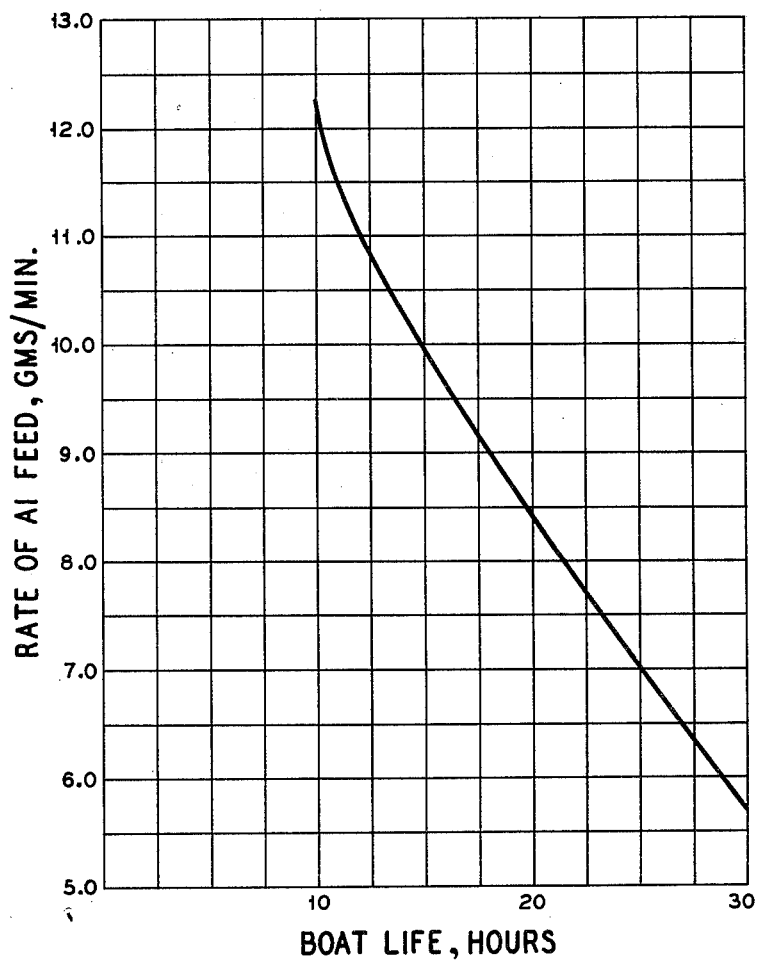

FIG. 1 is a perspective view of a typical boat-shaped crucible used in the method of the invention. FIG. 2 is a graph, the curve of which indicates the relationship between aluminum feed rate and the life of a crucible made as disclosed herein.

The foregoing and related objects are achieved by the present invention, which provides evaporating vessels made conductive by the presence therein of a refractory material having suitable electrical conductivity and resistance to molten aluminum. Suitable refractory materials include titanium diboride, zirconium diboride, titanium carbide and mixtures thereof.

In the practice of the invention, boron nitride particles are mixed with the conductive refractory material, and the mixture is hot pressed into crucible shape at a temperature of about 1700° C. to 2000° C., and at pressures of from about 500 to about 2000 p.s.i., and the crucible is used in vacuum plating.

The amount of boron nitride employed in the fabrication of the articles of the invention ranges from about 30 to 70 percent by weight, the balance being the selected conductive refractory material. To produce articles which will perform best, the oxygen content of the boron nitride raw material should not be greater than about 5 percent by weight; otherwise at the operating temperature of the vessel, the structure will be significantly weakened.

For the present purposes, it is important to provide finished crucibles having as close electrical resistivity limits as possible, so that major power changes will not have to be made on the vaporizing equipment as crucibles are replaced. Particle size changes will alter the continuity of the conductive phase; therefore, controlling the electrical resistivities of the crucibles resolves itself into controlling the particle sizes of the boron nitride and the conductive material. Particle size control is best obtained during the manufacture of the powdered materials by close process control. Milling of the conductive materials to size should be avoided to prevent contamination. This is especially true of the hard metal borides, such as titanium diboride ($TiB_2$) and zirconium diboride, which are very difficult to separate from impurities. One embodiment of this invention used boron nitride having an average particle size of 0.3 micron, together with titanium diboride having an average particle size of 15 microns. To obtain a homogeneous hot pressed vessel, the average particle size of the boron nitride and of the conductive refractory should not exceed 200 mesh. Suitable compositions have also been formed with $TiB_2$ particles as fine as 7 microns. In this case, a small increase in the amount of BN used is needed in order to obtain the same level of electrical resistance as that obtained with coarser $TiB_2$ particles. It is also possible to use particles as coarse as 15 microns and over.

In the preparation of the subject crucibles, boron nitride is first put through a micropulverizer to break down any agglomerates. The boron nitride then is blended with the conductive refractory so that a uniform dispersion of the two materials is obtained. The blending action should be such that the boron nitride is not smeared over the conductive refractory, thus causing variations in resistance, and that the refractory material does not wear the mill and contaminate the blend. Such intensive blending actions as ball milling should be avoided. One suitable method of blending is to use a tumbling barrel together with 5 penny nails at a blend to nails weight ratio of 2.0. After the nails are screened out, the blended mixture is hot pressed in a graphite mold at a temperature of 1800° C. at a pressure of 2000 p.s.i. The resultant pressed pieces are then machined to the desired shape of vessel. Because of the inherent anisotropy of boron nitride and the boride the resultant hot pressed piece is also therefore anisotropic: Consequently in order to maintain uniform electrical resistivity from vessel to vessel, the orientation of machining from the piece should remain the same.

Using the above described method, electrically conductive evaporators to be used in the vaporization of aluminum and having the shape shown on the accompanying FIG. 1, were fabricated from the following compositions (the balance of the material being boron nitride):

| Wt. Percent of TiB$_2$ | Vol. Percent of TiB$_2$ | Resistivity of Fabricated Material,[1] $\mu$ohm cm. |
|---|---|---|
| 70.00 | 53.8 | 180 |
| 59.00 | 41.8 | 900 |
| 55.00 | 37.8 | 1,560 |
| 53.00 | 36.05 | 2,500 |

[1] The compositions possess a positive temperature resistivity coefficient. The values shown were obtained at approximately 25° C. At 1400° C. the resistivities are approximately 2½ times higher.

As an example of the suitability of evaporator vessels of the above compositions for continuous metal vaporization, a 13¾ hour run is described here.

An evaporator vessel machined to a shape corresponding to FIG. 1 and of a composition containing 59% titanium boride, the balance being boron nitride, was tested in a cylindrically shaped vacuum metallizing chamber having inside dimensions of 30 inches long x 30 inches diameter. The outside dimensions of the evaporator vessel were 9¾ long by 11/16 wide by ½ inches thick. The dimensions of the cavity in the vessel were 4 inches long x 11/16 inch deep. The ends of the vessel were clamped between a pair of water-cooled cast aluminum jaws mounted within the chamber and electrically connected to metal lead-out terminals. A window was provided in the side wall of the chamber in order that the temperature of the vessel could be determined optically while operating as an evaporator. A vacuum pump of suitable capacity was connected to the chamber and an alternating current power source was connected thru suitable switches, meters and a control to the outer terminals. A feed mechanism and a roll of .064 inch diameter 99% plus purity aluminum wire were also installed adjacent to the evaporator vessel with suitable outside controls for regulating the rate of wire feed to the evaporator surface.

After the internal pressure within the chamber had been reduced to a value corresponding to .86 micron of mercury an electrical potential of 14 volts was applied to the lead-out terminals. After 20 minutes the evapator vessel temperature had risen to 1350° C. and the alternating current through the empty evaporator determined to be 612 amperes. At that time, the aluminum wire feed mechanism was started and the rate of feed adjusted to introduce aluminum to the vessel cavity at a rate of 11 grams per minute. This rate of feed was maintained during the entire 13¾ hour run. Approximately 20 pounds of aluminum were evaporated during the life cycle. With the introduction of aluminum to the vessel cavity a downward adjustment to the voltage across the evaporator lead-out terminals was required in order to maintain a proper temperature and ensure that the rate of aluminum vaporization remained commensurate with the rate of wire feed. In the tabulation shown below are listed successive voltage-current and vacuum conditions maintained during the run:

| Elapsed Time | Chamber Pressure, microns | Volts | Amperes | Remarks |
|---|---|---|---|---|
| 0 | .86 | 14 | 612 | Cavity empty. |
| 20 min | .86 | 12 | 612 | Aluminum in cavity. |
| 2 hrs | .46 | 9 | 630 | Do. |
| 5 hrs | .04 | 7.5 | 740 | Do. |
| 8 hrs | .06 | 7.0 | 770 | Do. |
| 13¾ hrs | .10 | 6.0 | 860 | ([1]) |

[1] Test discontinued—"hot spots" due to uneven corrosion began to appear on the evaporator surface.

The decreasing voltage and higher amperage occurring during the run is a reflection of the increase in cavity depth and consequent increase in volume of aluminum in the evaporator as the cavity surface in contact with molten aluminum is gradually corroded away. Thus the life of the evaporator is terminated only after a considerable amount of corrosion has taken place in the evaporator structure. Obviously the prior art graphite evaporator which is protected from corrosion by a "sacrificial" coating, such as TiC, would not be expected to provide for even one eight hour shift continuous operation, in commercial use.

It is to be pointed out that with an evaporator vessel of the size described in the foregoing example a vaporization rate of 11 grams of aluminum per minute approaches the maximum rate required by the industry for the metal vaporizing process. It should also be emphasized that the commercial operation is usually conducted at lower evaporation rates with the result that the service life of the evaporator vessels of the instant invention will frequently be considerably longer than 13¼ hours. To illustrate this point, a graph of the relationship between evaporator life and aluminum feed rate is given in FIG. 2. The graph is based on evaporator vessel life values obtained in a vaporization chamber under the same condition (except for feed rate) as those stated in the example run described earlier. The dimensions of the vessel were the same as those corresponding to the FIG. I illustration and the same was made of the same TiB$_2$–BN composition.

Although the method of heating the evaporator vessels described was through passage of current by voltage application at the ends, heating can also be effected by induced current or by other methods including electron bombardment or radiation.

It should be understood that the articles made in accordance with the present invention can be used to melt or vaporize any metal which will not react appreciably with BN or TiB$_2$, such as copper, silver, chromium, cadmium and others.

The articles fabricated in accordance with the preferred embodiment of the invention can be hot pressed to various desired shapes and sizes, and then be machined to exact dimensions. This latter feature is in contrast to pure titanium diboride articles, which are extremely difficult to machine.

This application is a continuation-in-part of application Serial No. 738,455, filed May 28, 1958, and now abandoned.

What is claimed is:

1. In a method for continuously plating an object by the vacuum vaporization of aluminum from an evaporator vessel, the improvement consisting of using a heated evaporator vessel composed essentially of about 30 percent to about 70 percent by weight of boron nitride, the balance being a conductive refractory material selected from the group consisting of zirconium diboride, titanium diboride, titanium carbide and mixtures thereof said vessel being conductive prior to contact with the aluminum.

2. In a method for continuously plating an object by the vacuum vaporization of aluminum from an evaporator vessel, the improvement consisting of using a heated evaporator vessel shaped from a compressed mixture of about 30 to about 70 percent by weight of boron nitride, the balance being a conductive refractory material selected from the group consisting of zirconium diboride, titanium diboride, titanium carbide and mixtures thereof said vessel being conductive prior to contact with the aluminum.

3. The method of claim 2 wherein said evaporator vessel is heated resistively by passing current therethrough.

4. The method of claim 2 wherein said vessel is heated by induction.

5. The method of claim 2, wherein said vessel is heated by electron bombardment.

6. The method of claim 2, wherein said vessel is heated by radiation.

7. The process of claim 2 wherein said selected conductive refractory material is titanium diboride.

References Cited by the Examiner
UNITED STATES PATENTS

| | | | |
|---|---|---|---|
| 1,991,204 | 2/35 | Grenagle | 117—107 |
| 2,872,327 | 2/59 | Taylor | 106—55 |
| 2,984,807 | 5/61 | Blum | 117—107 X |

FOREIGN PATENTS

| | | |
|---|---|---|
| 882,171 | 7/53 | Germany. |
| D. 19,878 | 5/56 | Germany. |

RICHARD D. NEVIUS, *Primary Examiner.*